Feb. 23, 1960   S. KOWALSKI   2,925,984
SOLENOID-OPERATED POPPET-TYPE SHUT-OFF VALVE
Filed Nov. 28, 1956   3 Sheets-Sheet 1
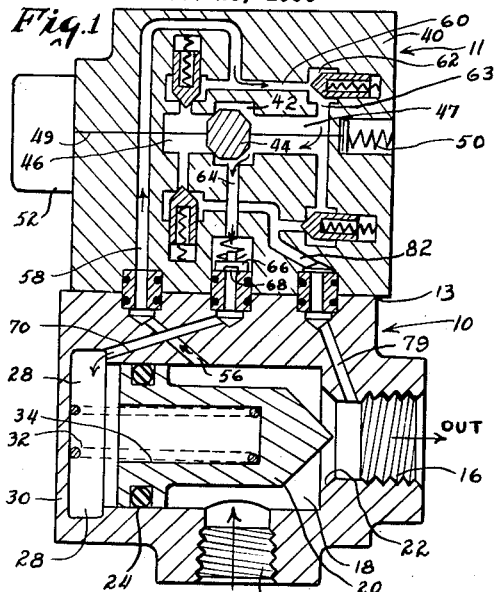
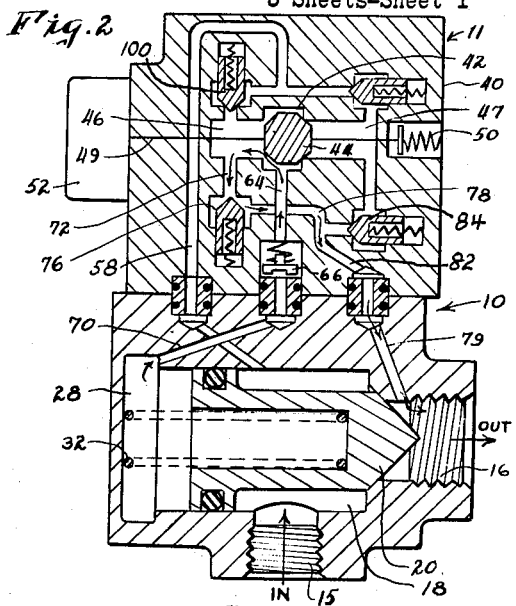
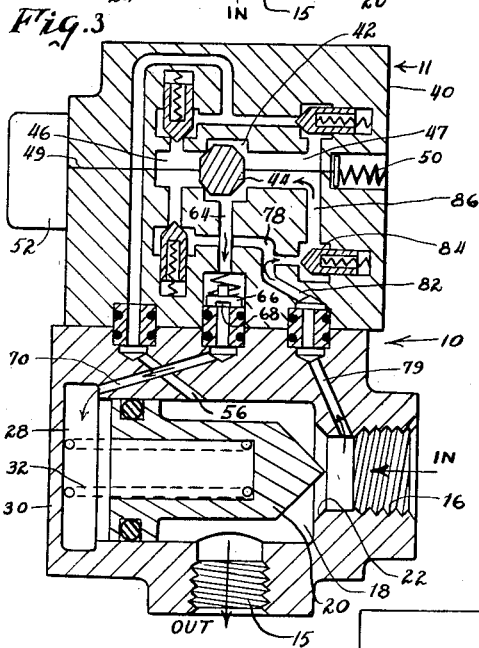
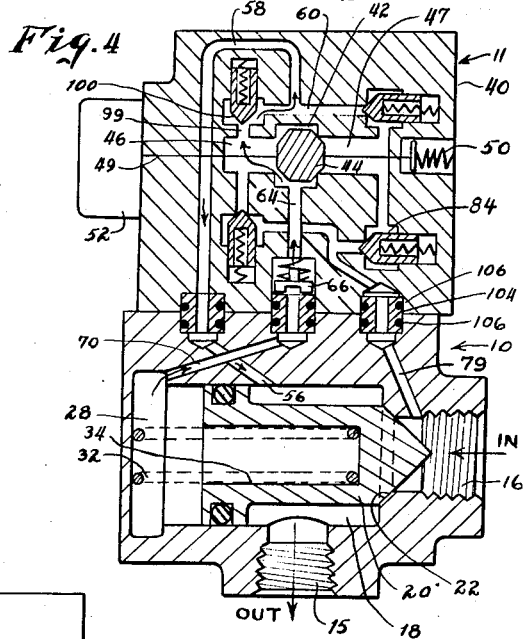
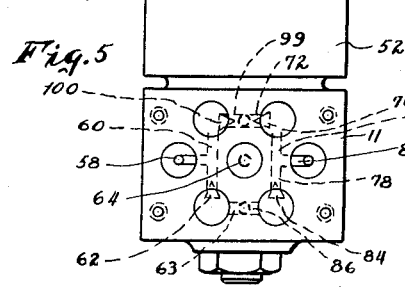
INVENTOR.
Slawomir Kowalski
BY Emery, Whittemore
Sandoe & Dix
ATTORNEYS

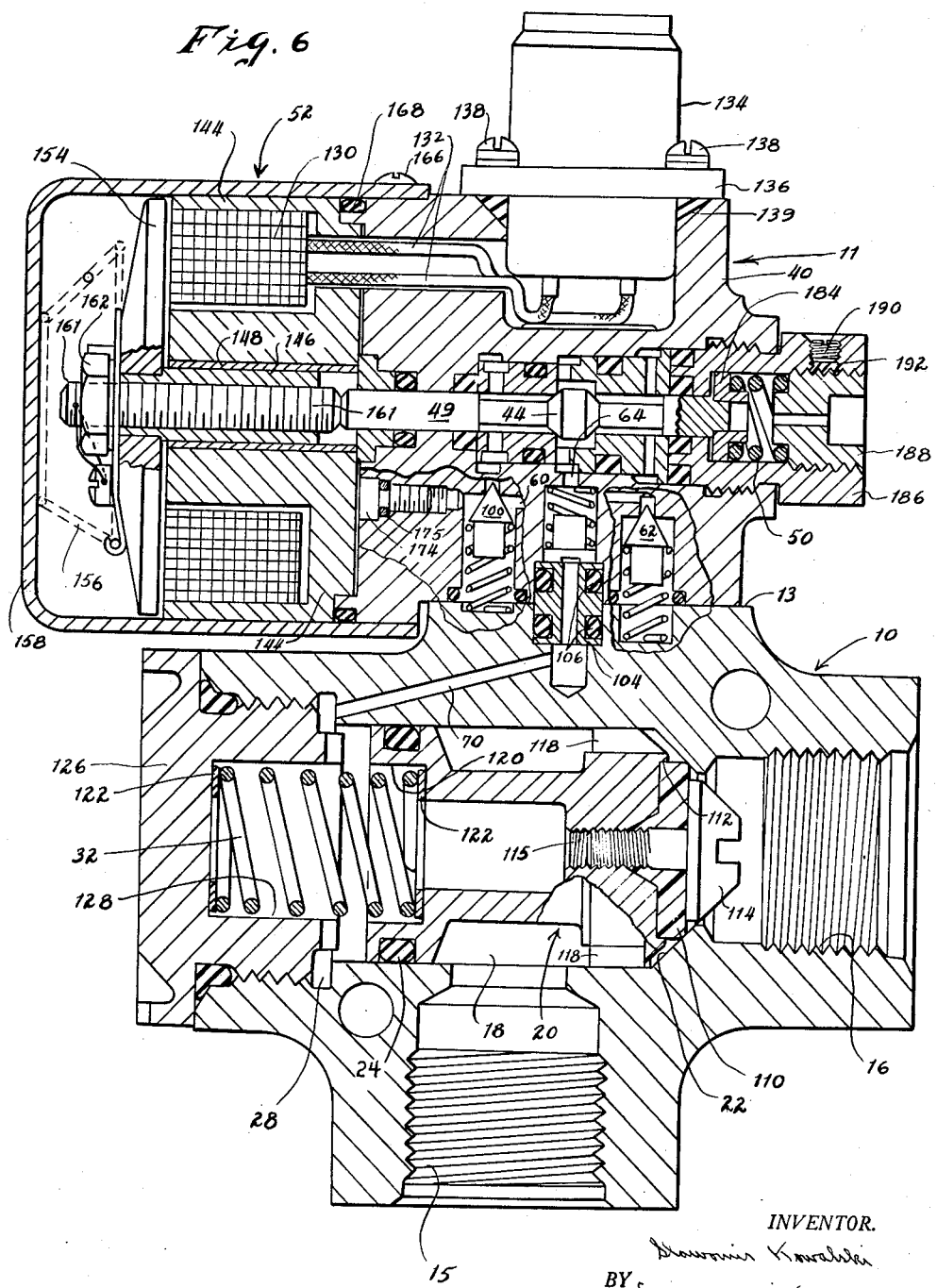

Feb. 23, 1960  S. KOWALSKI  2,925,984
SOLENOID-OPERATED POPPET-TYPE SHUT-OFF VALVE
Filed Nov. 28, 1956  3 Sheets-Sheet 3
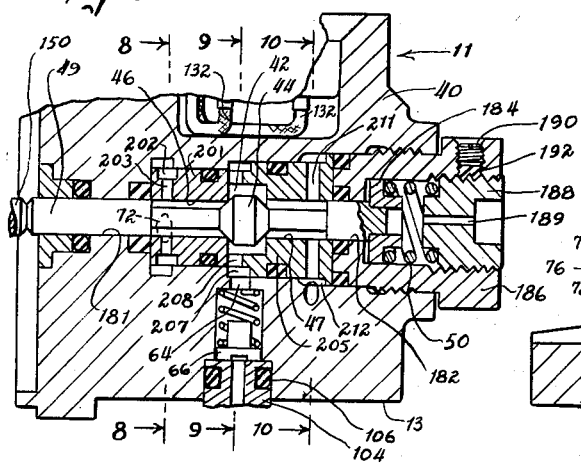
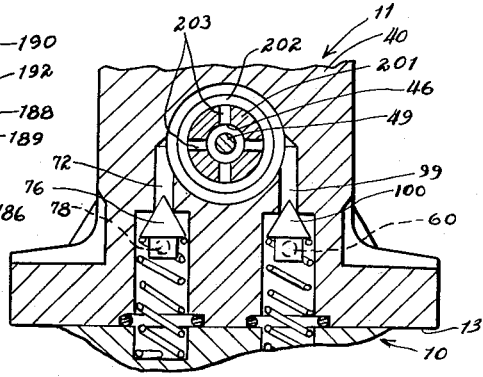
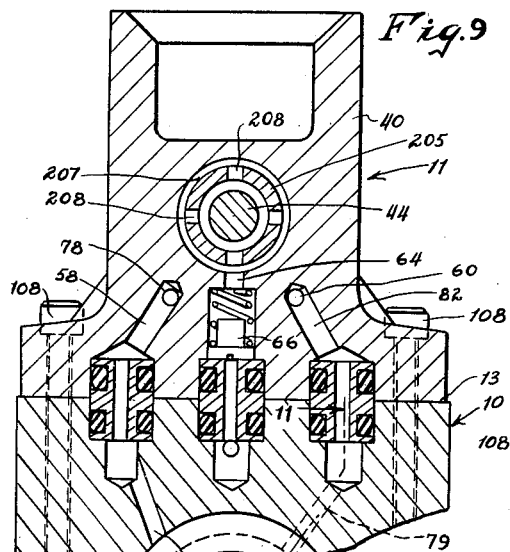
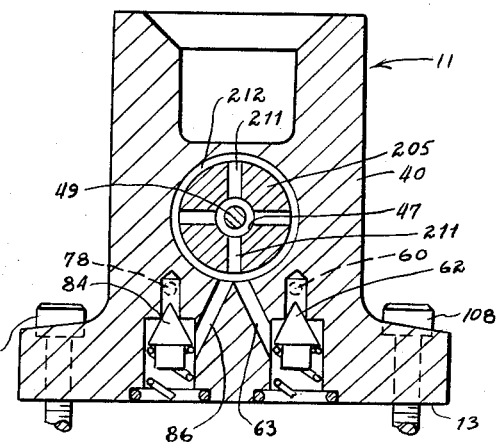
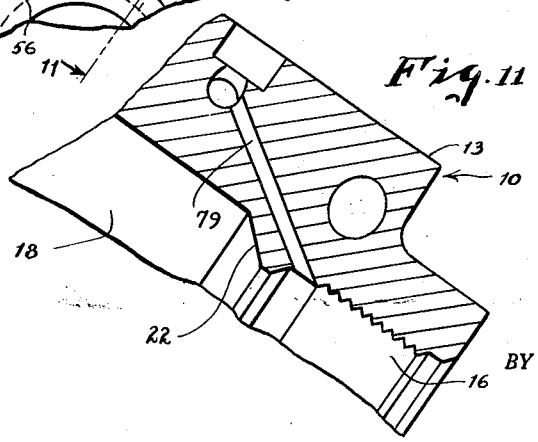
INVENTOR.
Slawomir Kowalski
BY Emery, Whittemore,
Sandoe & Dix
ATTORNEYS United States Patent Office 2,925,984
Patented Feb. 23, 1960

2,925,984

SOLENOID-OPERATED POPPET-TYPE SHUT-OFF VALVE

Slawomir Kowalski, Rockaway, N.J., assignor to Marotta Valve Corporation, Boonton, N.J., a corporation of New Jersey Application November 28, 1956, Serial No. 624,855

9 Claims. (Cl. 251—26)

This invention relates to pressure-operated valves, that is, valves in which the opening and closing force is applied by the fluid of which the valve controls the flow. The invention relates more especially to pressure-operated valves having pilot valve control, and with magnetic actuation of the pilot valve.

It is an object of the invention to provide an improved pressure-operated valve, of the character indicated, which will operate in the same way even though the direction of flow is reversed. Another object is to provide a pressure-operated valve in which the pressure is supplied to the same side of the pilot valve even though the direction of flow in the main fluid line is reversed.

Another object is to provide a pressure-operated valve, with pilot control, and with either side of the valve as the intake or outlet, in combination with means for changing the rate at which the valve operates.

Other objects, features and advantages of the invention will appear or be pointed out as the description proceeds.

In the drawing, forming a part hereof, in which like reference characters indicate corresponding parts in all the views;

Figures 1–4 are diagrammatic sectional views of a pilot controlled valve embodying this invention; these views illustrating the principle of operation of the invention.

Figure 5 is a bottom plan view of the pilot valve assembly shown in the subsequent figures and illustrated diagrammatically in Figures 1–4;

Figure 6 is a vertical sectional view, with some parts broken away to expose other sections, through a commercial valve made in accordance with this invention and operating on the principle illustrated in Figures 1–4;

Figure 7 is a fragmentary sectional view showing part of the assembly illustrated in Figure 6 but with the view taken on a single vertical plane;

Figures 8–10 are transverse, vertical sectional views taken on the lines 8—8; 9—9; and 10—10, respectively, of Figure 7; and Figure 11 is a sectional view taken on the line 11—11 of Figure 9.

The valve assembly shown in Figures 1–4 includes a main housing 10 and a pilot valve assembly 11 mounted on top of the main valve housing 10, the confronting surfaces of the housing 10 and pilot valve assembly 11 contacting one another along a plane indicated by the reference character 13. The main valve housing 10 has a passage 15 through its lower wall and a similar passage 16 through its front end wall. Each of these passages 15 and 16 is threaded to receive a fitting for connection with a pipe line or hose with which the valve is used. In Figure 1 the passage 15 is used as the inlet and the passage 16 as the outlet for the valve housing 10.

Within the valve housing there is a valve chamber 18, and there is a main valve element 20 located in the chamber 18. This main valve element closes against a tapered shoulder 22 to prevent flow of fluid to and from the passage 16.

At least the rearward part of the valve chamber 18 is cylindrical, the rearward part being that part to the left of the passage 15 in Figure 1. The rearward portion of the main valve element 20 fits the cylindrical rearward part of the valve chamber 18 as a piston and there is a piston ring consisting of an O-ring 24 in a peripheral groove in the valve element 20.

There is a pressure chamber 28 behind the valve element 20. This pressure chamber opens directly into the cylindrical portion of the chamber 18 and constitutes an extension of the valve chamber. The pressure chamber 28 is closed at its rearward end by an end wall 30 of the valve housing 10. A helical compression spring 32 is compressed between this rearward end wall 12 and the front end of a recess 34 in the rearward face of the main valve element 20.

The pilot valve assembly 11 includes a housing 40 enclosing a center pilot valve chamber 42 in which there is a pilot valve element 44. At its rearward end, the center chamber 42 communicates with a rearward chamber or passage 46; and at its forward end, the center chamber 42 communicates with a forward chamber or passage 47. There are shoulders at opposite ends of the center chamber 42, and the valve element 44 seats against these shoulders when at opposite ends of its travel.

In Figures 1–4 the pilot valve 44 is illustrated diagrammatically with a stem shown as a heavy line and indicated by the reference character 49.

A spring 50 urges the valve stem 49 rearwardly so that the pilot valve element 44 is normally in the position shown in Figure 1 in which it shuts off communication between the center chamber 42 and the rearward chamber 46, but leaves the center chamber 42 in communication with the forward chamber 47.

There is a magnet 52 at the rearward end of the valve stem 49; and this magnet, when energized, acts against the pressure of the spring 50 to move the pilot valve element 44 into the position shown in Figure 2 where it shuts off communication between the center chamber 42 and the forward chamber 47, while leaving the center chamber 42 in communication with the rearward chamber 46.

There are various passages and check valves located in the pilot valve assembly 11, and the invention can best be understood by describing these passages and valves in the sequence of operation of the parts illustrated in Figures 1–4. All of these sectional views are the same except that the parts are shown in different positions and at different times and conditions of operation.

Figure 1 shows the main valve element 20 during its closing stroke while fluid flows from the passage 15, through the valve chamber 18 and out through the passage 16. The pressure in the chamber 18 in front of the valve element 20, that is, to the right of the piston portion of the valve element 20, is substantially equal to the pressure of the fluid in the passage 15, and it is communicated to the chamber behind the valve element 20, through a passage 56 which leads from the main valve chamber 18 to the pilot valve housing 40 where it communicates with a passage 58 leading upwardly to a passage 60.

Fluid flows through the passage 60, past a check valve 62, and through a passage 63 to a port opening into the forward chamber 47 of the pilot valve. With the pilot valve element 44 in the position shown in Figure 1, the fluid flows from the forward chamber 47 past the pilot valve element 44 and downwardly through a passage 64 to the chamber of a check valve 66. Although this check valve 66 is closed, there is a restrictor slot 68 extending across the bottom face of the check valve 66 and this slot permits fluid to leak slowly past the check valve 66 even when the check valve is in closed position. The size of this restrictor slot 68 determines the rate at which fluid leaks past the closed check valve 66, and check valves with different sizes of restrictor slot are used to obtain different rates of closings for the valve element 20.

The fluid which passes the restrictor slot 68 flows downwardly through the passage 70 which communicates with the pressure chamber 28 behind the main valve element 20. This pressure behind the valve element 20 is substantially greater than that in front of the portion of the valve element which faces into the outlet passage 16; and as a result of this difference in pressure, in combination with the pressure of the spring 32, the main valve element 20 moves toward closed position, where it remains in what may be considered its "normal" position.

When the valve element 20 is to be moved into open position, the magnet 52 is energized and the stem 49 of the pilot valve element is moved toward the right in Figure 2 to shift the pilot valve element 44 into the position shown. With the parts in this position, fluid from the chamber 28 flows upwardly through the passage 70 past the check valve 66, and through passage 64 to a port opening into the center chamber 42 of the pilot valve. With the pilot valve element 44 in the position shown in Figure 2, the fluid flows past the pilot valve element into the rearward chamber 46.

From this chamber 46 the fluid flows through another passage 72, past a check valve 76 and then into a passage 78, 82, the latter of which communicates with another passage 79 opening into the outlet passage 16. The check valves 66 and 76 have a bias toward closed position imparted to them by springs, but the pressure of these springs is light so that the valves open easily and require very little pressure drop between the chamber 28 and the outlet passage 16 into which the chamber 29 exhausts, the fluid flow being indicated by the arrows in Figure 2.

Figure 3 shows the same structure as in Figures 1 and 2 but with the passage 16 used as the inlet passage and the passage 15 used as the outlet passage. Because of the combination of communicating passages and check valves in the pilot assembly 11, the deenergizing of the magnet 52 still causes the main valve element 20 to close as when the passage 15 was used as the inlet passage as in Figures 1 and 2. Conversely, energizing of the magnet 52 still causes the valve element 20 to be moved into open position.

Figure 3 shows the pilot valve element 44 in the position to which it is moved by spring 50 when the magnet 52 is de-energized. With the pilot valve element in this position, and with the inlet pressure in the passage 16, fluid travels through the passages 79, 82 and 78 to a check valve 84. The pressure opens the check valve 84 and permits the fluid to flow through a passage 86 to the front chamber 47 which is in communication through the center chamber 42, with the downwardly extending passage 64.

Although the check valve 66 is closed, as was the case in Figure 1, the fluid leaks through the restrictor slot 68 and past the closed check valve 66 to the passage 70 leading into the pressure chamber 28 behind the main valve element 20. Thus the pressure behind the main valve element is substantially equal to that in the passage 16, but the area exposed to the pressure in the passage 16 is substantially less than that exposed to the pressure in the chamber 28. Since the pressure in the chamber 18 is substantially less than that in the chamber 28, because of pressure drop caused by flow of fluid through the clearance between the valve element 20 and the shoulder 22, the valve element 20 moves forwardly from the position shown in Figure 3 into the closed position shown in Figure 4.

In Figure 4 fluid in the chamber 28 is at lower pressure than the fluid in the passage 16 because the chamber 28 is in communication with the front part of the main valve chamber 18 from which fluid is discharging through the passage 15. This communication is through the passage 70, past the check valve 66, and through passage 64, valve chamber 42 and 46, and a passage 99 to a check valve 100. This fluid pressure from the chamber 46 opens the check valve 100 and permits the fluid to flow through the passages 60, 58 and 56 to the valve chamber 18.

Thus fluid pressure on both sides of the large diameter, rearward portion of the valve element 20 is substantially equal, but the higher pressure against the portion of the front of the valve element 20 which faces the inlet passage 16 is sufficiently greater than the other pressure to move the valve element 20 into open position against the force of the spring 32.

In order to prevent leakage of high pressure fluid, where passages through the main valve housing 10 communicate with corresponding passages in the housing of the pilot valve assembly 11, there is a bushing 104 located in confronting counter bores in the connecting faces of the housing 10 and pilot valve assembly 11; and each of these bushings 104 has a sealing ring 106 located in each of the counter bores.

Before concluding the explanation of Figures 1–4, it should be noted that there are occasions when pressure in the rearward chamber 46 opens one of the check valves to which applied pressure does not open the check valve. For example, in Figure 2, the pressure in the chamber 46 opens the check valve 76 but does not open the check valve 100. Conversely, in Figure 4, the pressure in the chamber 46 opens the check valve 100 but does not open the check valve 76.

The reason for this selective operation of the check valves is that the check valves have sufficient clearance, in the guides in which they slide, to make the pressure behind the check valves equal to the pressure in the remainder of the check valve chambers. If the pressure in the chamber of check valve 100 is higher than the pressure in the chamber 46, because of the communication of the chamber of valve 100 with the valve chamber 18 as is the case in Figure 2, then the pressure from the chamber 46 cannot open the check valve 100. Similarly, when the pressure in the chamber of the check valve 76 is higher than the pressure in the chamber 46, because of the communication of the chamber of check valve 76 with the inlet passage 16, as is the case in Figure 4, the pressure in the passage 46 cannot open the check valve 76.

Figure 5 is a bottom plan view of the lower face of the pilot valve assembly 11. The construction illustrated corresponds in principle and mode of operation to the diagrammatic illustration in Figures 1–4 and the corresponding parts are indicated by the same reference characters as in Figures 1–4. However, the actual construction is that of the commercial embodiment of the invention shown in Figure 6 and Figure 5 serves to orient the parts of Figure 6 with the corresponding parts in the diagrammatic illustration.

It will be noted from Figure 5 that the passages 58, 64, and 82 which lead upwardly from the main valve housing, are located in a line transversely of the longitudinal axis of the housing instead of in a line parallel to the longitudinal axis as shown in the diagrammatic views of Figures 1–4. The arrangement of the connecting passages is somewhat different, therefore, but a comparison of Figure 5 with Figures 1–4 will make the relation of the corresponding parts immediately apparent, and will make the operation of the commercial embodiment illustrated in Figures 6–11 better understood by reference back to Figures 1–4.

Figure 6 has corresponding parts indicated by the same reference characters as in the diagrammatic illustrations of Figures 1–4. This figure shows that actual construction of the main valve element 20 which has a head 110 held in a cylindrical recess 112 in the forward end of the body of the valve element 20. This head is made of plastic material, the particular kind of material depending upon the service for which the valve is intended, particularly the pressure to be sealed and the temperature of operation. The head 110 is secured to the valve element 20 by a screw 114 extending through the center of the head 110 and threaded into an opening 115 in the body of the valve element behind the head.

The front of the valve head 110 is tapered around its periphery to obtain surface contact with the tapered shoulder 22 with which the valve head contacts when in closed position. The body of the valve element 20 behind the head 110 has vanes 118 which slide along the cylindrical surface of the chamber 18 to hold the valve element 20 in alignment with the bore of chamber 18.

The spring 32 extends into a counter bore 120 in the back of the valve element 20, and there is a stainless steel washer 122 for preventing the spring 32 from causing wear on the end face of the counter bore of the valve element which is preferably made of aluminum.

The back wall of the valve chamber 18 is formed by a plug 126 which threads into a counter bore at the rearward end of the pressure chamber 28. There is a recess 128 in the front of the plug 126 for receiving the rearward end of the spring 32. Another stainless steel washer 122 is located in this recess 128 to prevent wear of the aluminum plug 126. In the preferred construction the entire housing 10 is made of aluminum, the term "aluminum" being used herein to designate also aluminum alloys.

The magnet 52 includes a coil 130 which is connected with a source of power by conductors 132 leading to a receptacle 134 on top of the pilot valve assembly 11. The receptacle 134 has a flange 136 attached to the housing of the pilot valve assembly 11 by screws 138 and with a ring of sealing material 139 for preventing possible leakage of moisture and atmospheric gases into the interior of the assembly.

The coil 130 is located in an iron core element 144; and there is a plunger including a sleeve 146 movable back and forth in this core element 144 along a liner 148. The magnet 52 has an armature 154 extending across the end face of the core element 144; and there is a light spring 156 compressed between the armature 154 and an end wall 158 for preventing vibration of the armature 154. The plunger sleeve 146 has a reduced diameter end portion which extends through the armature 154. The sleeve 146 is internally threaded to accept an adjustment screw 161 which serves as a part of the plunger, and the armature is connected to the plunger sleeve 146 by a nut 162 threaded over the end of the screw 161. The right hand end of the screw 161 contacts with the stem 49 of the pilot valve and the length of the plunger is adjusted by moving the screw 161 further into the sleeve 146, or by backing the screw the other way in the sleeve 146.

The cover 158 is cylindrical and fits snugly over one end of the housing of the pilot valve assembly 11. The cover is secured to the housing of the pilot valve assembly by screws 166, and a sealing ring 168 is provided for preventing leakage of gas between the cover 158 and the surface of the pilot valve assembly housing over which the cover fits.

Passages, such as the passage 60, are drilled from one face of the housing and the end of the passage from which the drill entered is sealed with a threaded plug 174 (Figure 6) and an O-ring 175 secured in place at the end of a counter bore by a shoulder on the threaded metal plug 174.

Figure 7 shows the detailed construction of the pilot valve element and its associated parts. The valve stem 49 slides in bearings 181 and 182 in the housing 40 of the pilot valve assembly 11. The valve stem 49 is of reduced diameter in the chambers 46 and 47 so as to provide a clearance for the passage of fluid. The bearings 181 and 182 are of the same diameter as the bores of the chambers 46 and 47. This produces a balanced pilot valve by virtue of the fluid pressure against the shoulders where the valve stem 49 increases at the bearings 181 and 182, to the full diameter of the chambers 46 and 47.

At the forward end of the valve stem 49, it is of reduced diameter and fits into a spring retainer 184 movable axially in a counter bore in a bushing 186. The spring 50 is compressed between the spring retainer 184 and a plug 188 which screws into the forward end of the counter bore in the bushing 186. The plug 188 has an opening 189 for the passage of air to and from the space in which the spring 50 is enclosed; and the plug 188 can be screwed into and out of the bushing 186 to change the pressure on the spring 50. A set screw 190 is used to lock the plug 188 in any set position, and there is a plastic slug 192 between the set screw 190 and the threads of the plug 188 to prevent the set screw from damaging the threads.

The chamber 46 is surrounded by a liner 201 having an annular groove 202 in its outside surface and having openings 203 through which the chamber 46 communicates with the annular groove 202. This liner 201 fits the bore in the housing 10 and contacts with a shoulder at the end of the bore confronting the rearward face of the liner.

Another liner 205 surrounds both the valve chamber 42 and the front chamber 47. The outside surface of this liner 205 is cut away to provide an annular groove 207 and there are openings 208 in the liner 205 through which the valve chamber 42 communicates with the annular passage 207.

There are other radial passages 211 communicating with another annular passage 212 surrounding the liner 205. The bushing 186 contacts with the front end face of the liner 205 and clamps the rearward end face of this liner against the front of the liner 201 to hold the liner 201 against the shoulder of the housing 40 at the rearward end of the liner 201.

The passages 72 and 99 (Figure 8) communicate with the annular passage 202, and with the chamber 46 through the holes or openings 203 in the liner 201. The passage 64 communicates with the annular chamber 207 and with the valve chamber 42 through the openings 208 in the liner 205. The passages 86 and 63 (Figure 10) communicate with the annular passage 212 and with the front chamber 47 through the openings 211 in the liner 205.

Figure 9 shows the passages 58, 64, and 82 in their transverse relation previously shown in Figure 5. Passage 56 leading down through the valve housing 10 to the valve chamber 18 is also shown in Figure 9; and the passage 79, which is ahead of the plane of section of Figure 9, is shown in dotted lines. The location of this passage 79, in the commercial valve, is shown clearly in Figure 11.

The invention has been illustrated and described in its preferred embodiment, but changes and modifications can be made, and some features can be used in different combinations without departing from the invention as defined in the claims.

What is claimed is:

1. A pilot controlled shut-off valve including a housing having a main valve chamber therein, at least the rearward portion of the main valve chamber being cylindrical and constituting a pressure chamber, a valve element in said chamber, the rearward portion of the valve element fitting the chamber as a piston, a shoulder at the forward end of the chamber, a first fluid passage opening through the housing beyond the shoulder and communicating with the chamber through an opening surrounded by the shoulder, a second fluid passage through the housing and opening into the chamber intermediate the shoulder and the rearward portion of the valve element, the valve element being movable through a stroke at one end of which the valve element seats against the shoulder to shut off communication between the first and second passages, and at the other end of which the valve element is in its open position and said first and second passages are in communication with one another, a pilot control valve including a housing with a valve chamber and a pilot valve element therein, control passages through which the pressure chamber behind the main valve element communicates with a port opening into the first passage, other control passages through which said pressure chamber behind the main valve element communicates with another port opening into the valve chamber ahead of the piston portion of the main valve element, the valve chamber of the pilot control valve constituitng a portion of the control passages through which the pressure chamber behind the main valve element communicates with the main valve chamber and with said first passage, there being passages connecting both ports with the pilot valve chamber on both sides of the pilot valve element so that either port can be used for fluid supply or exhaust without changing the passages to the pilot valve chamber, check valves in certain of the control passages for preventing communicaiton of the ports with one another through said control passages and for determining which control passage shall supply fluid to, and exhaust fluid from, the pressure chamber behind the main valve element, the pilot valve element being movable into different positions to selectively open and close control passages through which the space behind the main valve element communicates with the main valve chamber and with said first passage, and means for shifting the pilot valve element between its different positions, including means biasing the pilot valve element toward a position to supply pressure to the pressure chamber behind the main valve element to move the main valve element toward closed position.

2. The pilot-controlled shutoff valve described in claim 1 and in which the means for shifting the pilot valve between its different positions constitutes a magnetically-operated device for moving the pilot valve in one direction and spring means for biasing the pilot valve in the opposite direction.

3. The pilot-controlled valve described in claim 1 and in which the control passages for the pressure chamber behind the main valve element include a port opening into the pilot valve chamber at an intermediate location between the ends of the chamber and include also ports opening into the pilot valve chamber at opposite ends of said pilot valve chamber, and the pilot valve element has seats at opposite ends for closing the end ports, the space between the seats being less than the space between the ports whereby at least one of the ports is open at all times.

4. The pilot-controlled shutoff valve described in claim 1 and in which the passages communicating with the pressure chamber behind the main valve element include a check valve which opens to permit relatively rapid flow of fluid in one direction, and the check valve has a restriction port through which fluid flows in the other direction at a relatively slow rate when the check valve is closed.

5. The pilot-controlled shutoff valve described in claim 1 and in which the pilot valve element is moved in one direction by magnetic operating means and is moved in the other direction by a spring, the magnetic operating means and the spring being carried by the pilot control valve housing, and said pilot control valve housing being detachably connected to the main valve housing.

6. A pilot-controlled shutoff valve comprising a housing having a main valve chamber therein, a main valve element in the chamber, a pressure chamber behind the valve element for fluid that moves the valve element toward closed position, a shoulder at one end of the chamber in front of the valve element and on which the valve element seats when in closed position to prevent flow of fluid through an opening that is surrounded by the shoulder, a first passage through the housing beyond the shoulder and communicating with the opening through the shoulder, a second passage through the housing communicating with the valve chamber at an intermediate location between the pressure chamber and the shoulder, a pilot valve chamber having an intermediate port and having end ports, a pilot valve element in the pilot valve chamber and movable into different positions to put the intermediate port selectively into communication with one or the other of the end ports, passages connecting the pressure chamber with the intermediate port of the pilot valve chamber, other passages connecting each of the end ports with both the main valve chamber and the first passage beyond the shoulder against which the main valve element seats, means biasing the pilot valve element toward a position to supply fluid to said pressure chamber to close the main valve element, said other passages including different branches with check valves therein limiting flow through one end port to flow away from the pilot valve chamber and limiting flow through the other end port to flow toward the pilot valve chamber.

7. A pilot-controlled shutoff valve comprising a housing having a main valve chamber and having two main flow passages communicating therewith including a first passage and a second passage, a main valve element located in the chamber and commanding the first passage, a pressure chamber behind the main valve element and beyond the second passage, a pilot valve housing having a valve chamber therein and a pilot valve element movable into different positions in the pilot valve chamber, a pilot passage connecting an intermediate port of the pilot valve chamber with the pressure chamber behind the main valve element, other pilot passages through which the main valve chamber and said first passage both communicate with each end of the pilot valve chamber, said other passages including different branches with check valve elements therein limiting flow to one direction and to a different direction at each end of the pilot valve chamber, and means biasing the pilot valve element toward a position to supply pressure to the pressure chamber behind the main valve element to move the main valve element toward closed position.

8. A pilot-control shutoff valve comprising a housing having a main valve chamber, a main valve element located in said chamber and having a rearward end portion that fits the chamber as a piston leaving a pressure chamber behind the valve element for fluid to move the valve element toward the closed position, a shoulder at one end of the valve chamber in front of the valve element and against which the valve element seats when in closed position, a first passage through the housing communicating with the valve chamber through an opening surrounded by said shoulder, a second passage through the housing communicating with the valve chamber at an intermediate location between the pressure chamber and the shoulder, a pilot valve housing enclosing a chamber, a pilot valve element in the pilot valve chamber, the pilot valve chamber having an intermediate port and opposing end ports, the latter being surrounded by shoulders against which the pilot valve seats selectively when moved longitudinally within its valve chamber, a passage connecting the intermediate port of the pilot valve chamber with the pressure chamber behind the main valve element, a passage leading from an intermediate location of the main valve chamber and having two branches each of which communicates with a different one of the end ports of the pilot valve chamber, a check valve in one branch oriented to prevent flow from the pilot valve chamber, a check valve in the other branch oriented to prevent flow toward the pilot valve chamber, another passage communicating with the first passage of the main valve element and having two branches each of which communicates with a different one of the end ports of the pilot valve chamber, a check valve in one branch oriented to prevent flow of fluid away from the pilot valve chamber, a check valve in the other branch oriented to prevent flow of fluid toward the pilot valve chamber, and yieldable means holding the pilot-control valve in position to supply pressure to the pressure chamber behind the main valve element to close the main valve element, and operator-controlled means for moving the pilot-control valve into another position to connect said pressure chamber with the passage of the main valve on the downstream side of the shoulder against which the main valve element seats.

9. The pilot-controlled shutoff valve described in claim 8 and in which the means for holding the pilot-control valve in one position is a spring, and the operator-controlled means is a magnetically-operated device.

References Cited in the file of this patent

UNITED STATES PATENTS

| | | |
|---|---|---|
| 338,771 | Page et al. | Mar. 30, 1886 |
| 570,727 | Gale | Nov. 3, 1896 |
| 2,372,456 | Stewart | Mar. 27, 1945 |
| 2,698,729 | Cox | Jan. 4, 1955 |
| 2,754,840 | Hicks | July 17, 1956 |